United States Patent
Schnoell

(10) Patent No.: US 10,090,721 B2
(45) Date of Patent: Oct. 2, 2018

(54) METHOD FOR PRODUCING A ROTOR FOR AN ELECTRIC MOTOR

(71) Applicant: LEANTEC MOTOR GMBH, Saalfeld (DE)

(72) Inventor: Josef Schnoell, Munich (DE)

(73) Assignee: LEANTEC Motor GmbH, Saalfeld (DE)

( * ) Notice: Subject to any disclaimer, the term of this patent is extended or adjusted under 35 U.S.C. 154(b) by 319 days.

(21) Appl. No.: 14/654,286

(22) PCT Filed: Dec. 13, 2013

(86) PCT No.: PCT/EP2013/003774
§ 371 (c)(1),
(2) Date: Jun. 19, 2015

(87) PCT Pub. No.: WO2014/095014
PCT Pub. Date: Jun. 26, 2014

(65) Prior Publication Data
US 2015/0349596 A1    Dec. 3, 2015

(30) Foreign Application Priority Data

Dec. 19, 2012 (EP) .................................. 12008423

(51) Int. Cl.
H02K 1/27 (2006.01)
H02K 1/28 (2006.01)
H02K 15/03 (2006.01)
H02K 1/04 (2006.01)

(52) U.S. Cl.
CPC ............. *H02K 1/2793* (2013.01); *H02K 1/04* (2013.01); *H02K 1/278* (2013.01); *H02K 1/28* (2013.01); *H02K 15/03* (2013.01); *Y10T 29/49014* (2015.01)

(58) Field of Classification Search
CPC ........ H02K 1/278; H02K 1/2793; H02K 1/28; H02K 15/03
USPC .......................... 310/156.23, 156.28, 156.31
IPC ...................................... H02K 1/27,1/28, 15/03
See application file for complete search history.

(56) References Cited

U.S. PATENT DOCUMENTS

| 5,921,754 | A | 7/1999 | Freitas et al. | |
|---|---|---|---|---|
| 6,472,784 | B2 * | 10/2002 | Miekka | B60L 11/1807 310/181 |
| 6,633,106 | B1 * | 10/2003 | Swett | H02K 1/2793 310/268 |
| 6,674,214 | B1 * | 1/2004 | Knorzer | F04B 35/04 310/268 |

(Continued)

FOREIGN PATENT DOCUMENTS

| DE | 102008050832 A1 | 4/2010 |
|---|---|---|
| EP | 1111756 A2 | 6/2001 |

(Continued)

*Primary Examiner* — John K Kim
(74) *Attorney, Agent, or Firm* — Laurence A. Greenberg; Werner H. Stemer; Ralph E. Locher

(57) ABSTRACT

A method for producing a rotor body includes producing one or more fiber strips from fiber material, and providing cutouts in the fiber strip or in the fiber strips. The fiber strip or the fiber strips are oriented in relation to one another such that at least one of the cutouts lies on another of the cutouts so that cutouts which lie one above the other form a three-dimensional receptacle for a magnet. A rotor for an electric motor with a rotor body is also provided.

19 Claims, 4 Drawing Sheets

(56) References Cited

U.S. PATENT DOCUMENTS

| | | | | |
|---|---|---|---|---|
| 7,714,479 | B2* | 5/2010 | Seneff | H02K 1/2793 |
| | | | | 310/156.21 |
| 7,990,011 | B2 | 8/2011 | Yoshino et al. | |
| 8,558,428 | B2 | 10/2013 | Sugiyama et al. | |
| 8,598,761 | B2* | 12/2013 | Langford | H02K 1/2793 |
| | | | | 310/156.28 |
| 2006/0279166 | A1* | 12/2006 | Takeuchi | H02K 3/28 |
| | | | | 310/268 |
| 2010/0019613 | A1* | 1/2010 | Saban | H02K 1/02 |
| | | | | 310/216.086 |
| 2012/0313461 | A1 | 12/2012 | Takeuchi | |
| 2015/0349596 | A1* | 12/2015 | Schnoell | H02K 15/03 |
| | | | | 310/156.23 |

FOREIGN PATENT DOCUMENTS

| | | |
|---|---|---|
| JP | 2000501474 A | 2/2000 |
| JP | 2007215291 A | 8/2007 |
| JP | 2011151877 A | 8/2011 |

\* cited by examiner

METHOD FOR PRODUCING A ROTOR FOR AN ELECTRIC MOTOR

BACKGROUND OF THE INVENTION

Field of the Invention

The invention relates to a method for producing a rotor body as well as a corresponding rotor body and a rotor with such a rotor body.

A low-inertia electrical drive with a rotor body bearing permanent magnets is known from the document DE 10 2006 036 707 B3. The rotor body is produced, for instance, from a fibre-enhanced plastic and is provided with receptacles or recesses for inserting the permanent magnets. The fixing of the permanent magnets can be done, for instance, by gluing.

The disadvantage of the above-described method for producing the rotor body is that the rotor body is firstly produced in its entirety with a plane surface, and the receptacles for the permanent magnets are only provided afterwards by machining, for instance, by drilling, milling or waterjet cutting. The rotor body is therefore not producible in a continuous process.

BRIEF SUMMARY OF THE INVENTION

The object of the present invention is to suggest an improved method for producing a rotor body with receptacles for magnets. In particular, no reworking of the rotor body for producing said receptacles shall be necessary.

The object is solved by a method for producing a rotor body, which is characterized in that one or more fibre strips are produced from fibre material, wherein recesses are provided in the fibre strip or in the fibre strips, and that the fibre strip or the fibre strips are aligned such that at least one of said recesses lies on another one of said recesses so that recesses lying on top of each other form a three-dimensional receptacle.

According to the invention, the rotor body is formed from one or more fibre strips. This is done by firstly producing one or more fibre strips of fibre material, said fibre strip(s) comprising one or more recesses, to say openings, cuts or holes. Afterwards, the fibre strip or the fibre strips are aligned to each other, particularly on top of each other and/or side by side and/or folded, so that some of the recesses are lying on top of each other. Several stacked recesses in the fibre strip or in the fibre strips form a three-dimensional hollow space serving as receptacle for a magnet.

A fibre strip according to the invention is preferably produced by weaving. For producing said fibre strips, advantageously, the reverse weft method known from the textile manufacturing is employed. At least two fibres of the fibre material are crossed together. Usually, several fibres (warp fibres) form a carrier in which further fibres (weft fibres) are inserted transversely to the warp fibres. Warp fibres and weft fibres can hereby form virtually any angle to one another, for instance, an angle of 90°, 60°, 45° or 30°.

Different areas of the rotor body are exposed to different levels of stress when using the rotor produced thereof. Therefore, it is advantegeous to interweave the warp fibres and the weft fibres in various areas of the fibre strip differently, particularly to vary their angular alignment to one another or to vary the weaving density in order to take into account the different levels of stress of the rotor body being produced. For instance, it is advantegeous to provide the fibre strip in an edge region with a greater fibre density, to say a higher number of fibres per volume, than the average fibre density of the fibre strip.

The recesses in the fibre strip can be directly produced by weaving. The fibre material is interwoven such that the recesses are formed at the desired places.

In another embodiment of the invention, a fibre strip without recesses is initially woven. Afterwards, the fibres of the fibre strip are shifted to each other such that the desired recesses are formed in the fibre strip. To do this, the fibre material can be interwoven more loosely in the region of the fibre strip, for instance, where a recess shall be provided, so that the fibres can be moved to each other more easily after the weaving.

The fibre strips cannot only be produced by weaving but also by knitting or braiding. Carbon fibres, glass fibres or aramide fibres, basalt fibres or other synthetic and natural fibres, fibres from polymers or manufactured inorganic fibres can be used as fibre material.

The fibre strip is or the fibre strips are advantageously produced such that said fibre(s) already comprise(s) recesses. When weaving the fibre strips, the aforesaid can be realized, for instance, by inserting the weft fibres only through a part of the warp fibres. Thus, the produced fibre strip comprises a plurality of recesses, holes, openings or cuttings.

In an embodiment of the invention, several ring-segment-shaped, annular, segment-shaped or circular fibre strips with, respectively, one or more recesses are produced. The fibre strips are placed side by side and/or on top of each other respectively are aligned such that some of the recesses in the fibre strips form together a receptacle for a magnet. By using ring-segment-shaped, annular, segment-shaped and/or circular fibre strips, a round rotor body can be easily produced.

In another embodiment, a spiral fibre strip with several recesses is produced. By the term "spiral fibre strip", a fibre strip is meant which winds in form of a helix, a screw or a cylindrical spiral around the sheathing of a virtual cylinder. The spiral fibre strip is provided in several stacked layers, wherein the recesses in the fibre strip are provided such that when laying the fibre strip, at least two recesses each basically lie congruently on one another. When manufacturing the spiral fibre strip, at least two recesses are aligned at an angle of 360° to each other, respectively, so that one recess is on the other recess after a complete revolution of the fibre strip.

The rotor body produced according to the invention is preferably used in a rotor of an electric motor and shall comprise a plurality of evenly arranged magnets. Hence, a corresponding number of recesses are provided in the fibre strip. For instance, after every 10°, a recess is provided in the fibre strip, or the fibre strip is produced such that said fibre strip comprises a recess every 10°. This way, an annular fibre strip comprises 36 recesses that way. If more of such fibre strips are stacked such that their recesses are directly above the other, the desired receptacles will be formed. In the above-mentioned variant with a spiral fibre strip, a recess matches with a recess offset by 360°.

The usage of a spiral fibre strip has the advantage that the rotor body can be produced in one process step by placing said fibre strip on top of each other until the rotor body comprises the desired thickness. Thus, the rotor body can be provided with the desired thickness in a single working step. When the recesses have been suitably provided in the fibre strip, said recesses are automatically superposed when placing said fibre strip on top of each other.

It should be noted that the desired thickness of the final product usually is not equal the thickness of the fibre strip placed on top of each other. Namely, if the fibre strip placed on top of each other is compressed in a further process step, the thickness is significantly reduced. Therefore, the fibre strip, for instance, has to be placed with a thickness approximately 30% higher than the desired thickness of the rotor body in order to reach the desired final dimension after compression.

It is also possible to produce the rotor body from several spiral fibre strips. Each of the spiral fibre strips is hereby only placed on top of each other to the extent that a part of the desired thickness of the rotor body is provided. The components respectively produced from one fibre strip are then assembled to the final rotor body.

For instance, two thin cylindrical coverings can be produced from a single spiral fibre strip without recesses, respectively. The central part of the rotor body is produced from another fibre strip with recesses, wherein the recesses are provided such that said recesses partly lie on one another forming receptacles for magnets. In said recesses, magnets are inserted. Both thin cylindrical coverings are arranged on both sides of the central part of the rotor body with the magnets and said coverings are connected with the central part so that the magnets are firmly fixed in their position in the respective receptacle. In other words: Two cover layers without recesses and a central rotor body part with recesses are produced from the fibre strip. The rotor body is then formed in a sandwich construction from said cover layers and said central rotor body part. Said cover layers thereby cover the entire surface of the central rotor body part with the recesses, whereby the stiffness of the entire rotor body is increased.

When aligning a spiral fibre strip for producing the rotor body, one of the recesses in one part of the fibre strip is superimposed on a recess in a different part of said fibre strip. If several, for instance, annular-segment-shaped or ring-shaped fibre strips are used instead of a spiral fibre strip, said fibre strips are aligned such that one of the recesses in one fibre strip is superimposed on a recess in a different fibre strip.

It is of advantage to place the fibre strip or the fibre strips in a cavity. The cavity represents a negative form of the desired rotor body. By the cavity it is ensured that the rotor body produced by the arrangement and alignment of the fibre strips or the fibre strip comprises the desired size and shape. The production of the rotor body is significantly facilitated by the cavity.

The alignment of the recesses in the fibre strip or the fibre strips to each other, for instance, a superimposing of two recesses, is facilitated in a preferred embodiment of the invention by providing placeholders in the cavity and that the fibre strip or the fibre strips are placed into the cavity such that the placeholders are provided in the receptacles. The recesses in the fibre strip or in the fibre strips are, for instance, attached on the placeholders or placed thereon. Preferably, size and shape of the placeholders correspond to those of the magnets which shall be provided in the receptacles of the rotor body.

In a further embodiment, the magnets are positioned in the cavity and the fibre strip or the fibre strips are placed in the cavity such that said magnets are provided in the receptacles. The magnets are initially positioned at the places in the cavity at which said magnets should be after completion of the rotor. The fibre strip or the fibre strips is/are arranged around said magnets in the cavity. For this purpose, the recesses according to the invention are provided in said fibre strips.

In yet another embodiment, the above-mentioned placeholders are provided as pusher in the cavity such as those used in the injection molding manufacturing. Thereby, the magnets can only be pushed into the recess after the compressing and hardening of the fibre/resin composition. This method is particularly necessary when using resins which harden at high temperatures, which the magnets cannot withstand, for instance, at temperatures higher than 120° C.

The method according to the invention is particularly used for producing rotor bodies and rotors for electric motors. Such rotors often comprise a plurality of magnets, which are all provided at the same distance from the centre, the pivot of the rotor, and each having the same distance to their adjacent magnets. Thus, it is of advantage to produce and align the fibre strips in such a manner that a plurality of receptacles for magnets is formed. Correspondingly, the rotor body advantageously comprises a circular cross section and the receptacles are equally spaced from the centre of the circle of the rotor body.

The invention is also suitable for producing a rotor at which the magnets are arranged in more than one circular ring. For instance, the magnets can be arranged in two concentric circles, an inner and an outer circle, around the rotation axis of the rotor body. The recesses respectively the receptacles are provided accordingly. Hereby, it is of advantage to arrange the receptacles at an offset angle to each other, to say the radius of the rotor body cuts maximally one receptacle of the inner circle or one receptacle of the outer circle but not both receptacles.

After aligning the fibre strip or the fibre strips, the aforesaid are advantageously embedded in a matrix. A polymer is used as matrix, particularly a duromer (thermoset material, synthetic resin), an elastomer or a thermoplast. It is also possible to use a ceramic matrix.

The polymer is preferably hardened by pressure increase and/or temperature increase and forms a rotor body of very high stability with the fibre material after hardening with regard to tensile, compressive and bending stress.

In a further embodiment, the rotor body is of carbon fibre reinforced plastics (CFRP). For this, several layers of carbon fibres are provided in a plastic matrix of thermoplastics or duromers particularly of epoxy resin.

In another embodiment of the invention, the fibre volume content, to say the number of fibres per volume, is increased at an outer edge of the fibre strip. For this, the warp fibres are laid more closely at the outer edge than in the remaining part of the fibre strip, for instance. It is particularly convenient to increase the fibre volume content in the area of the fibre strip adjacent to the recesses and/or in the bars between the recesses. Thereby, both an increased stability with regard to the absorption of the centrifugal forces, which act on the magnets to be provided in the receptacles respectively the receptacles, and an improved stiffness of the rotor body can be achieved as an overall result.

BRIEF DESCRIPTION OF THE SEVERAL VIEWS OF THE DRAWING

The invention as well as further details and embodiments of said invention are described in more detail by schematic drawings in the following. Hereby, the figures show different process steps of producing a rotor body according to the invention.

DESCRIPTION OF THE INVENTION

Figure 1:
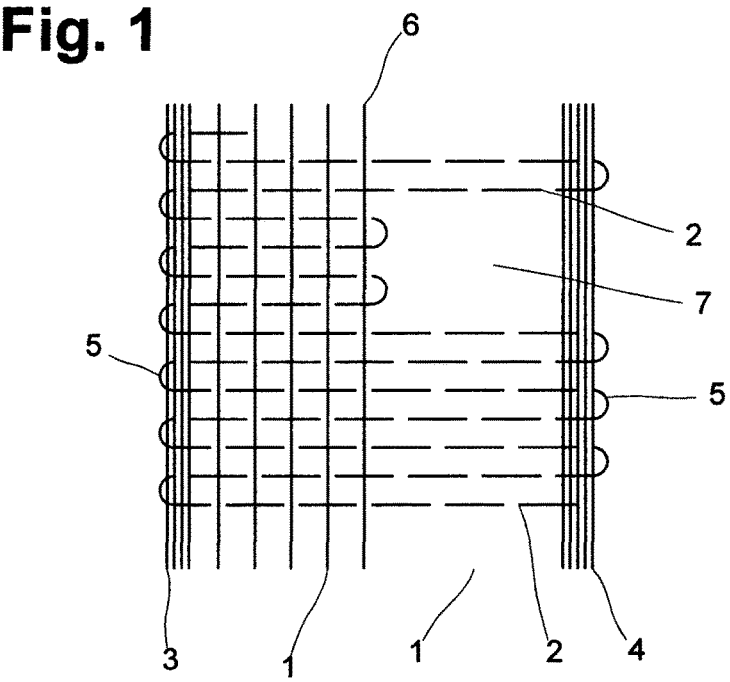
FIG. 1 the weaving of a fibre strip,
FIG. 2 a woven spiral fibre strip,
FIG. 3 the inserting of a fibre strip in a cavity,
FIG. 4 the placeholders arranged in the cavity, FIG. 5 the contacting of the fibre strip with a matrix and the hardening of the rotor body and FIG. 6 a rotor produced according to the invention.
Figure 2:
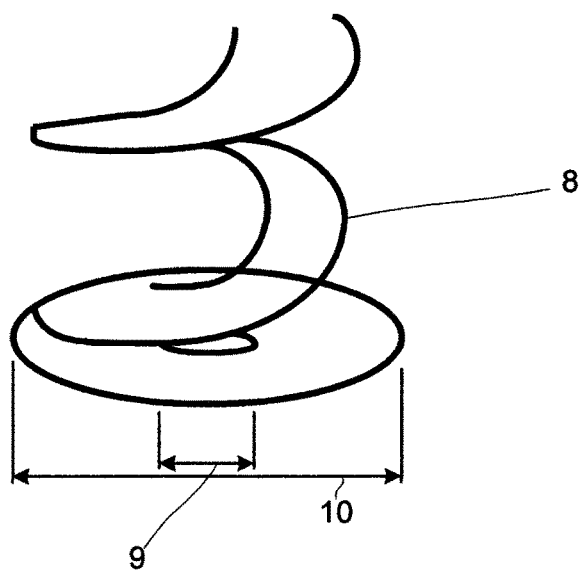

In the FIGS. 1 to 6, the production process of a rotor for an electric motor according to the invention is schematically shown, particularly for an electric motor as described in DE 10 2006 036 707. The rotor is produced from a fibre composite material and comprises a plurality of magnets, which are arranged evenly and with equal distance from the rotor axis.

The rotor comprises a disc-shaped rotor body which is of a carbon fibre-plastic-composite material. Instead of carbon fibres, glass fibres, aramid fibres, basalt fibres or other synthetic or natural fibres, fibres from synthetic polymers or manufactured inorganic fibres or a combination of said fibres can be used.

To produce said rotor, carbon fibres are initially woven to a spiral fibre strip. Several so-called warp fibres 1 form a carrier, in which weft fibres 2 are inserted (see FIG. 1). The fibres 1, 2 are interwoven according to the so-called reverse weft method. The weft fibres 2 are preferably inserted at right angles to said warp fill tires 1. After crossing the outermost warp fibres 3, 4, the weft fibre 2 is woven between the warp fibres 1 in reverse direction. By reversing the direction of the weft fibres 2 at the edge of the fibre strip to be produced, the edge region of said fibre strip will be enhanced and stable edges 5 are formed. Moreover, the warp fibres 1 are arranged more closely at the edge regions, whereby said edge regions are additionally enhanced.

At certain regions, the weft fibres 2 are not woven over the entire width of the fibre strip to be produced, to say not from the outermost warp fibre 3 to the opposite outermost warp fibre 4. The direction of a weft fibre 2 is reversed at a warp fibre 6 lying between the outermost warp fibres ("half reverse weft"). After several such half reverse wefts, a complete weft follows, to say the weft fibre 2 is pulled through from the outermost warp fibre 3 to the other outermost warp fibre 4. This way, a recess or opening 7 is formed, in which no crossing warp and weft fibres are present.

By the above-mentioned method, a long spiral fibre strip 8 (see FIG. 2) is produced, which comprises recesses 7 at predetermined points. Said spiral fibre strip 8 has, for instance, an inner diameter 9 between 50 and 100 mm and an outer diameter 10 between 250 and 300 mm.

Instead of the above-mentioned, immediate weaving of the recesses 7 into the fibre strip, it is also possible to interweave the warp fibres 1 and the weft fibres 2 over the entire width and length of said fibre strip and subsequently shifting said warp fibres 1 and said weft fibres 2 so that the desired recesses 7 are provided.

The dimensions of the fibre strip, particularly its inner diameter 9 and its outer diameter 10, are chosen in dependence of the size of the rotor to be produced. The outer diameter 10 is, for instance, between 150 mm and 600 mm, for common electric motors and generators. It is also certainly possible to employ the invention with larger dimensions for producing rotors of electrical machines. For instance, rotor bodies with an outer diameter between 1000 mm and 3000 mm can be produced by the method according to the invention, as employed in generators for wind power plants.

The length of the fibre strip 8 is provided such that the spiral stapled fibre strip 8 corresponds to the thickness of the rotor body to be produced after the compressing and hardening. Due to the compaction occurring during the compressing of the fibre strip, a certain excess length has to be calculated for said fibre strip, to say the stapled fibre strip 8 has a larger thickness before the compressing step than the final rotor body shall have.

Figure 3:
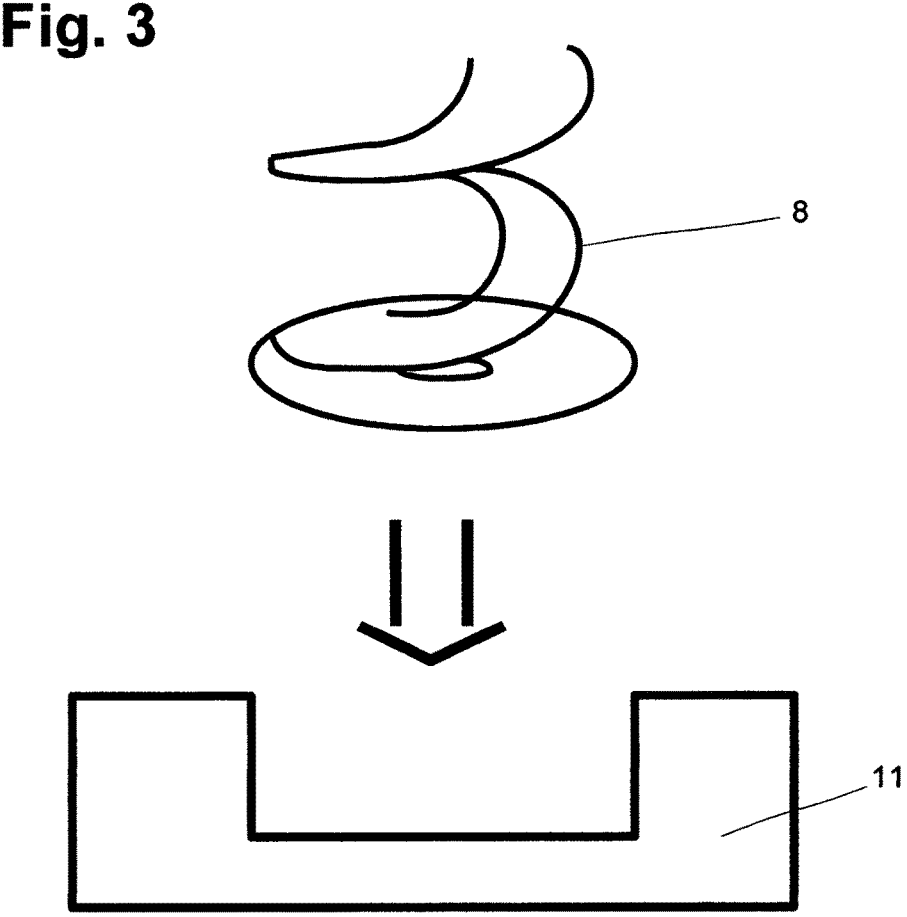

In a next process step, the fibre strip 8, as shown in FIG. 3, is placed in a cavity 11. Said cavity 11 corresponds to the negative form of the desired rotor body.

Figure 4:
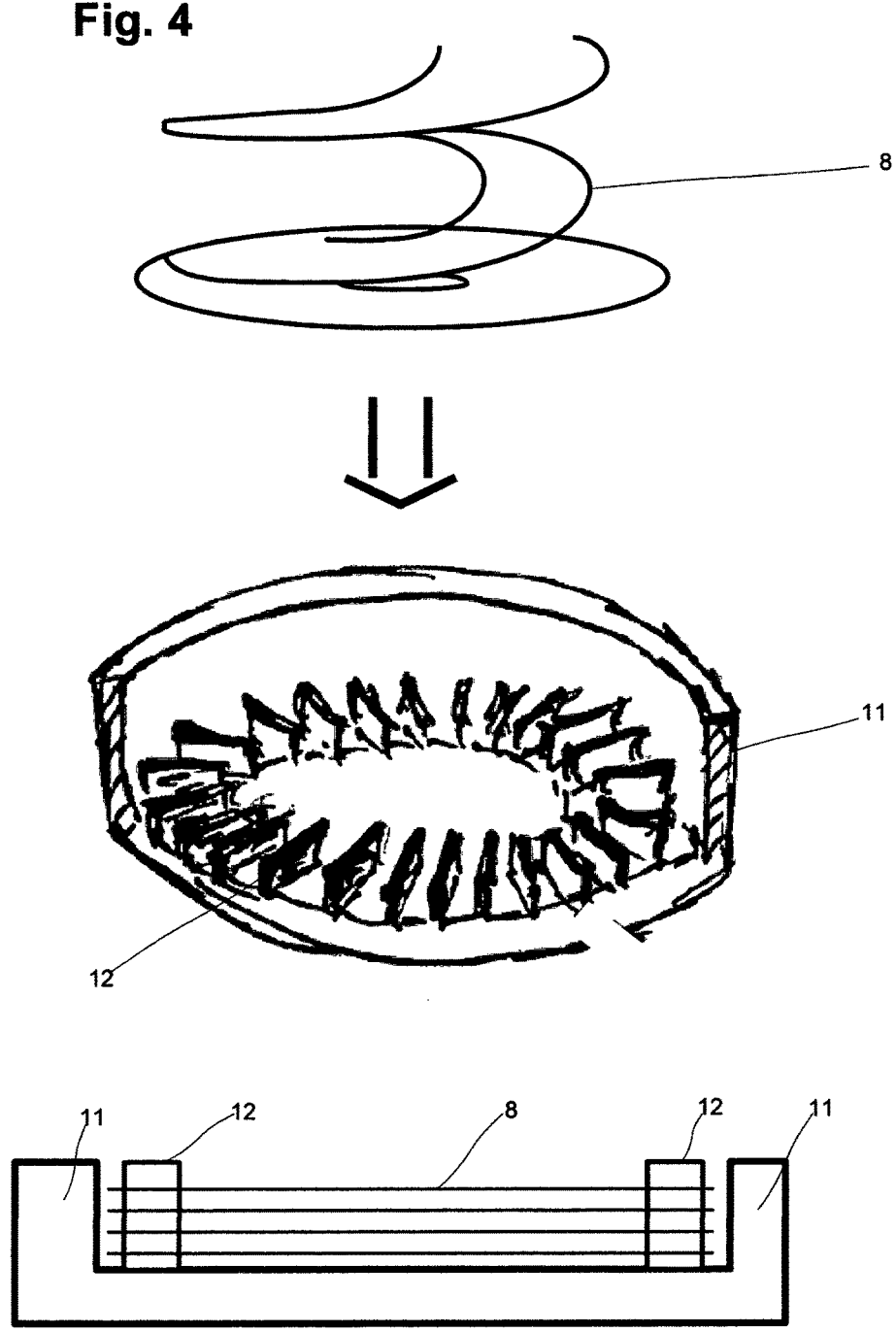

In FIG. 4, a cut through the cavity 11 is shown. At the bottom of the cavity 11, a plurality of placeholders 12 is arranged in a circular manner. The placeholders 12 can be, for instance, of the same material as the rest of the cavity 11 and said placeholders are firmly connected with said cavity. Au lieu of the firm connection with the cavity 11, the placeholders 12 can also be movable, in particular shiftable, and preferably shiftable in the direction parallel to the symmetry axis of the cavity 11 and parallel to the rotation axis of the rotor body to be produced (hereinafter called z-axis). The placeholders 12 are provided at the points, at which the magnets are provided after completion of the rotor body.

The fibre strip 8 is placed in the cavity 11, wherein the placeholders 12 are placed in the recesses 7 of the fibre strip 8.

After the fibre strip 8 has been placed in the cavity until the desired thickness 13, a polymer 14, which is used as matrix for the fibre-enhanced rotor body, is placed in the cavity 11. The polymer 14 is preferably a duromer, an elastomer or a thermoplast, for instance, a synthetic resin or an epoxy resin or a ceramic material. Alternatively, the prefabricated fibre strip can already be soaked with a polymer.

Figure 5:
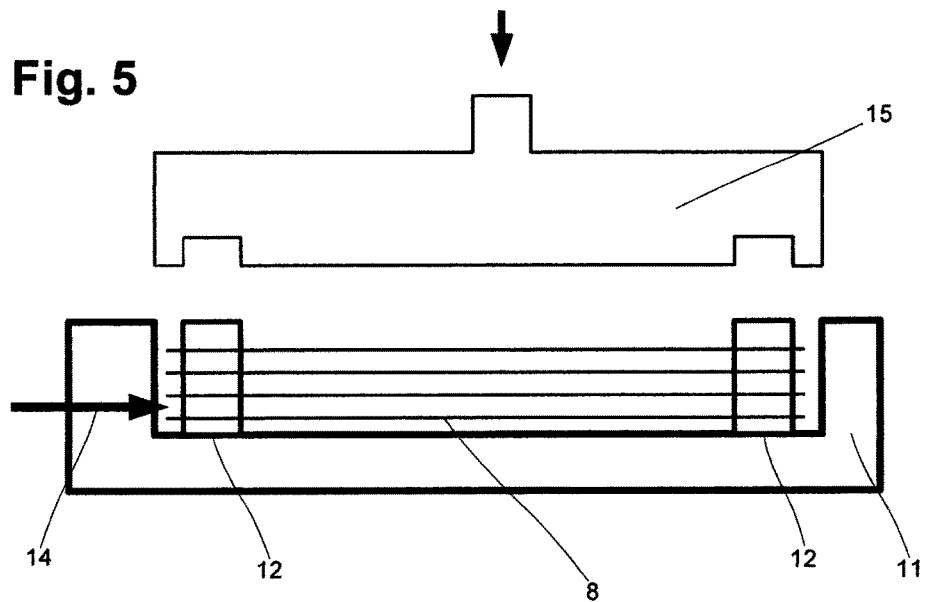
Figure 6:
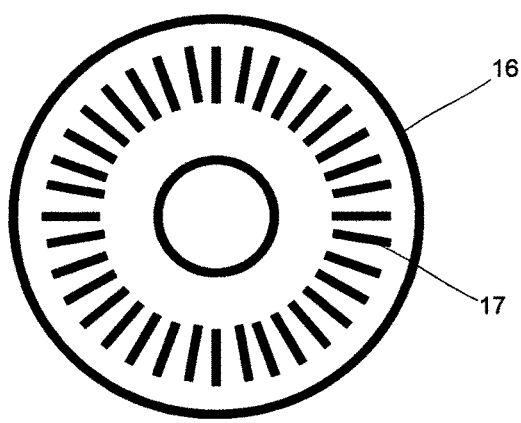

This way, the fibre strip 8 is embedded in a polymer matrix 14. Said polymer 14 is then hardened by a temperature increase and a pressure increase. For this, the cavity 11 is heated and the fibre strip 8, which is in the cavity 11, is compressed by a plunger 15 (FIG. 5).

After hardening of the fibre strip-polymer-compound, the produced rotor body 16 is removed from the cavity 11. The produced rotor body 16 is ring-shaped and disc-shaped and comprises a plurality of receptacles 17 arranged in a circular manner. The receptacles 17 are provided at those points which have been kept free by the placeholders 12.

Finally, magnets are placed in the receptacles 17 and then said magnets are fixed in the receptacles, for instance, glued in the receptacles 17.

By using the invention, it is possible to produce a rotor body 16 with receptacles 17 in a continuous production process. The previously necessary process step, to say to drill, to cut, to mill or to waterjet receptacles 17 for magnets into the rotor body 16, is no longer necessary.

In another embodiment of the invention, the magnets, which shall be arranged in the finished rotor body 26, shown in the process step in FIG. 4 are used as placeholders 12. As mentioned with regard to the embodiment above, the magnets are fixed to the desired positions in the cavity 11 or shifted in the recesses in the direction of the z-axis by a shifting system. Thereby, the movable placeholders can be shifted into the lower half of the cavity 11 or into the plunger 15.

After infilling/injecting respectively by vacuum infusion of the polymer 14 such as a synthetic resin in the cavity 11, the compressing and the hardening the composite material, which is made of the fibre strip 8 and the polymer 14, the magnets are firmly embedded in the rotor body 16 and encapsulated together with the fibre strip 8. By this embodiment of the invention, the complete rotor of rotor body 16 and magnets can be produced in a continuous process.

The rotor body 16 produced according to the invention is preferably used as rotor in an electric motor or generator, for instance, in a transverse flux machine.

The invention claimed is:

1. A method for producing a disc-shaped rotor body, the method comprising the following steps:
    producing at least one fiber strip of fiber material;
    providing recesses in the fiber material of the at least one fiber strip;
    aligning the at least one fiber strip causing at least one of the recesses to lie on top of another one of the recesses and causing the recesses lying on top of each other to form a three-dimensional receptacles in the disc-shaped rotor body; and
    placing magnets in the receptacles.

2. The method according to claim 1, which further comprises producing the at least one fiber strip as several ring-segment-shaped or circular-ring-shaped fiber strips each having at least one respective recess.

3. The method according to claim 1, which further comprises producing the at least one fiber strip as a spiral fiber strip with several recesses.

4. The method according to claim 1, which further comprises placing the at least one fiber strip in a cavity.

5. The method according to claim 4, which further comprises:
    providing placeholders in the cavity; and
    placing the at least one fiber strip in the cavity causing the placeholders to be provided in the receptacles for later installation of the magnets.

6. The method according to claim 1, which further comprises providing the rotor body with a circular cross section defining a circle center of the rotor body, and spacing the receptacles equally from the circle center of the rotor body.

7. The method according to claim 1, which further comprises producing the at least one fiber strip by weaving.

8. The method according to claim 7, which further comprises weaving the recesses into the at least one fiber strip.

9. The method according to claim 7, which further comprises shifting a part of the fiber material of the at least one fiber strip to form the recesses in the at least one fiber strip after the weaving of the at least one fiber strip.

10. The method according to claim 1, which further comprises providing a higher number of fibers per volume in an edge region of the at least one fiber strip than an average number of fibers per volume of the entire at least one fiber strip.

11. The method according to claim 1, which further comprises bringing the at least one fiber strip into contact with a polymer after aligning the at least one fiber strip.

12. The method according to claim 11, which further comprises selecting the polymer as a duromer, an elastomer or a thermoplast.

13. The method according to claim 11, which further comprises hardening the polymer.

14. The method according to claim 1, which further comprises hardening the polymer by increasing at least one of pressure or temperature.

15. The method according to claim 13, which further comprises placing the magnets in the receptacle of the rotor body after hardening of the polymer.

16. The method according to claim 1, which further comprises producing the rotor body from a carbon fiber reinforced plastic.

17. A rotor for an electric motor, the rotor comprising:
    a disc-shaped rotor body formed of at least one fiber strip of fiber material;
    said at least one fiber strip having recesses formed in said fiber material of said at least one fiber strip;
    said at least one fiber strip being aligned to cause at least one of said recesses to lie on top of another one of said recesses and to cause said recesses lying on top of each other to form three-dimensional receptacles; and
    magnets disposed in said receptacles.

18. The rotor body according to claim 17, wherein said magnets are permanent magnets.

19. The rotor body according to claim 18, wherein said permanent magnets are each disposed in a respective one of said receptacles.

* * * * *